(12) United States Patent
Lodha

(10) Patent No.: US 7,489,701 B2
(45) Date of Patent: Feb. 10, 2009

(54) CUSTOMER-SPECIFIC TRAFFIC SHAPING

(75) Inventor: Sandeep Lodha, Sunnyvale, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 940 days.

(21) Appl. No.: 10/620,668

(22) Filed: Jul. 16, 2003

(65) Prior Publication Data

US 2004/0196788 A1 Oct. 7, 2004

Related U.S. Application Data

(60) Provisional application No. 60/459,714, filed on Apr. 2, 2003.

(51) Int. Cl.
H04L 12/28 (2006.01)
(52) U.S. Cl. .............. 370/412; 370/230.1; 370/395.42; 370/429
(58) Field of Classification Search ......... 370/229–235, 370/395.4, 395.41, 395, 395.42, 395.43, 370/252–253, 412–420, 428–429
See application file for complete search history.

(56) References Cited

U.S. PATENT DOCUMENTS

| 6,067,301 | A  | * | 5/2000 | Aatresh ..................... 370/418 |
| 6,532,213 | B1 | * | 3/2003 | Chiussi et al. ............ 370/230.1 |
| 7,002,916 | B2 | * | 2/2006 | Parruck et al. ............. 370/235 |
| 2003/0081546 | A1 | * | 5/2003 | Agrawal et al. ............ 370/229 |
| 2004/0042399 | A1 | * | 3/2004 | Bly et al. .................. 370/230.1 |

* cited by examiner

*Primary Examiner*—Ricky Ngo
*Assistant Examiner*—Pao Sinkantarakorn

(57) ABSTRACT

A technique for managing a customer's traffic in a network node, such as a service provider edge device, involves dedicating a group of queues in the network node to the customer, performing queue-specific rate shaping on the customer's traffic according to queue-specific bandwidth limitations, and performing group-specific rate shaping on the customer's traffic as a whole according to a group-specific bandwidth limitation. In an embodiment, the queues in the group are associated with different types of customer traffic in order to provide type-specific rate shaping. Further, the queues may be prioritized among each other such that unused excess bandwidth is distributed among the different traffic types in priority order.

4 Claims, 8 Drawing Sheets

| Round | % Group BW Available | Individual Queue % Group BW Vector | | | | Individual Queue Enablement Vector | | | | Group Enablement | Result Vector | | | |
|---|---|---|---|---|---|---|---|---|---|---|---|---|---|---|
| | | 40 | 30 | 20 | 10 | | | | | (232) | | | | |
| | | 0 | 50 | 90 | 5 | | | | | (234) | | | | |
| 1/1 | 100 | 0 | 0 | 0 | 0 | Y | Y | Y | Y | Y | *Y* | *Y* | *Y* | *Y* |
| 1/2 | 70 | 0 | 30 | 0 | 0 | Y | N | Y | Y | Y | *Y* | *N* | *Y* | *Y* |
| 1/3 | 50 | 0 | 30 | 20 | 0 | Y | N | N | Y | Y | *Y* | *N* | *N* | *Y* |
| 1/4 | 45 | 0 | 30 | 20 | 5 | Y | N | N | Y | Y | *Y* | *N* | *N* | *Y* |
| 2/1 | 45 | 0 | 30 | 20 | 5 | Y | N | N | Y | Y | *Y* | *Y* | *Y* | *Y* |
| 2/2 | 25 | 0 | 50 | 20 | 5 | Y | N | N | Y | Y | *Y* | *Y* | *Y* | *Y* |
| 2/3 | 0 | 0 | 50 | 45 | 5 | Y | N | N | Y | N | *N* | *N* | *N* | *N* |
| 2/4 | 0 | 0 | 50 | 45 | 5 | Y | N | N | Y | N | *N* | *N* | *N* | *N* |

Figure 2B

CUSTOMER-SPECIFIC TRAFFIC SHAPING

CROSS REFERENCE TO RELATED APPLICATION

This application is entitled to the benefit of provisional Patent Application Ser. No. 60/459,714, filed 2 Apr. 2003.

FIELD OF THE INVENTION

The present invention relates generally to controlling packet-based traffic flow, and more particularly to using rate-shaping tools to shape packet-based traffic on a per-customer basis.

BACKGROUND OF THE INVENTION

Many end-users, such as businesses, obtain access to the Internet through an intermediate service provider. Typically, the service provider provides a connection, referred to as a "pipe," to an end-user in exchange for payment. The cost of the pipe typically varies depending upon the size of the pipe (i.e., the bandwidth).

A service provider often provides an end-user, referred to herein as a customer, with a single pipe and all of the customer's traffic is handled the same within the pipe. However, the customer may have different types of traffic such as voice over Internet Protocol (VoIP) traffic, virtual private network (VPN) traffic, Internet traffic (e.g., web browsing), etc., which have different priorities. For example, the customer may prefer that the VoIP traffic be given a higher priority than the Internet traffic. Some customers may even wish to dedicate a portion of the available bandwidth to each type of traffic. The "guaranteed" rate that results from dedicating a portion of the available bandwidth to a traffic type is often referred to as a "committed rate" for the traffic type. Customers also prefer that unused bandwidth be distributed to the customer's other traffic according to a designated priority order.

In view of the desire to meet the needs of customers, what is needed is a technique for managing a customer's traffic that is sensitive to the customer's different traffic types.

SUMMARY OF THE INVENTION

A technique for managing a customer's traffic in a network node, such as a service provider edge device, involves dedicating a group of queues in the network node to the customer, performing queue-specific rate shaping on the customer's traffic according to queue-specific bandwidth limitations, and performing group-specific rate shaping on the customer's traffic as a whole according to a group-specific bandwidth limitation. In an embodiment, the queues in the group are associated with different types of customer traffic in order to provide type-specific rate shaping. Further, the queues may be prioritized among each other such that unused excess bandwidth is distributed among the different traffic types in priority order.

In an embodiment, a system for customer-specific traffic shaping includes a plurality of queues, a plurality of queue-specific rate shapers respectively associated with the plurality of queues, a plurality of group-specific rate shapers configured to be associated with groups of the plurality of queues, and a group establishment module configured to dedicate a group of the queues to a customer and to associate one of the group-specific rate shapers with the group of queues that is dedicated to the customer.

In another embodiment, customer-specific traffic shaping involves dedicating a group of traffic channels to a customer, performing traffic-type-specific rate shaping according to a traffic-type-specific bandwidth limitation respectively associated with each traffic channel, and performing customer-specific rate shaping according to a customer-specific bandwidth limitation respectively associated with each group.

Exemplary figures illustrate embodiments of the invention that are easy to configure, economical in consumption of hardware resources, readily expandable to include multiple rate shapers, and can readily be used to shape traffic in existing networks. Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 2A and 2B are block diagrams of a traffic forwarding system in accordance with an embodiment, for use in the system of FIG. 1A.

DETAILED DESCRIPTION OF THE INVENTION

Figure 1A:
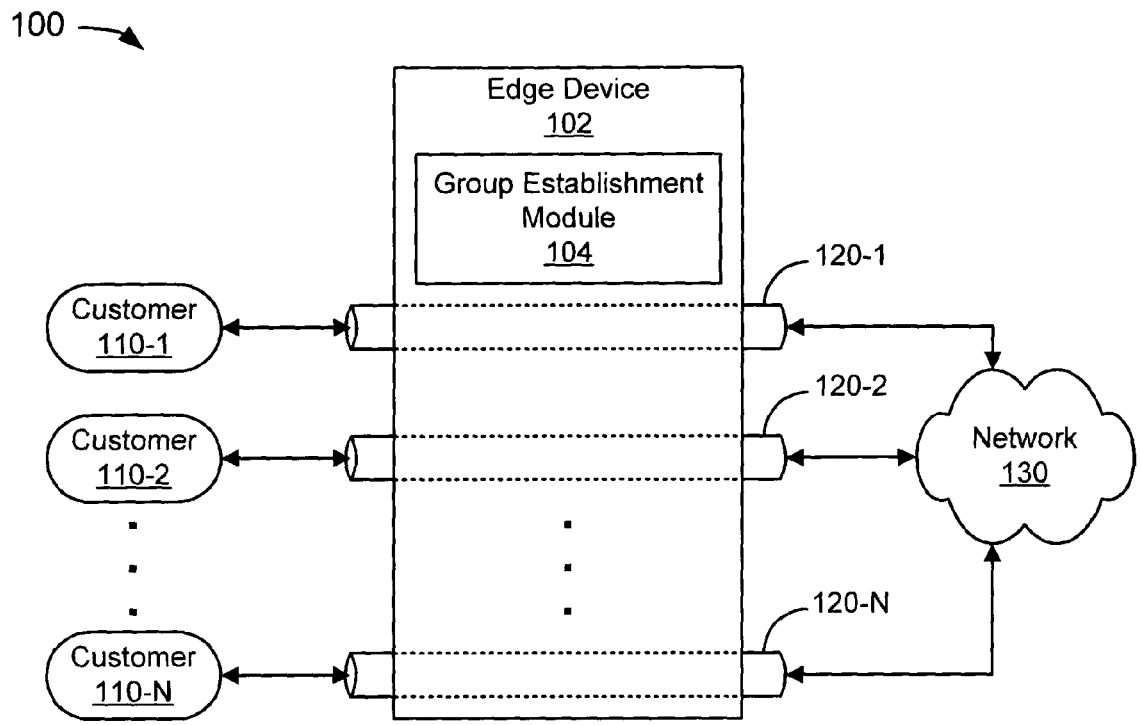
FIGS. 1A, 1B, and 1C are block diagrams of a system for forwarding packet-based customer traffic in accordance with an embodiment.

As shown in the drawings for the purposes of illustration, an embodiment of the invention is a service provider edge device (referred to herein as an "edge device") that forwards a customer's packet-based traffic using grouped queues. A customer identifies a bandwidth need through the edge device and allocates the total available bandwidth among particular traffic types. To control the bandwidth consumption of the customer's traffic to the desired levels, queues in the edge device are dedicated to each of the customer's particular traffic types. The edge device performs rate shaping on a per-traffic type basis and a per-customer basis by rate shaping each customer-specific queue individually and rate shaping all of the customer's dedicated queues as a whole.

FIG. 1A is a block diagram of a network 100 through which customer traffic is forwarded. The network includes an edge device 102, multiple customers 110-1 to 110-N (referred to collectively as customers 110), and a network 130 (e.g., a service provider network or the Internet). The edge device 102 includes a group establishment module 104 and multiple pipes 120-1 to 120-N (referred to collectively as pipes 120). The edge device 102 may include a central processing unit (CPU), memory, input and output interfaces, and other components. These components are well-known in the art of edge devices, so a detailed description has been omitted. The edge device 102 may be owned or administered by a service provider, such as an Internet service provider (ISP). It should be noted that pipes 120 are logical elements that refer to logical paths through the edge device. Typically, a pipe through an edge device has a characteristic of some committed bandwidth. For example, a pipe may have a committed bandwidth of 250 Mbps. A pipe may be implemented within the edge device 102 in part by dedicating one or more queues to the pipe. In an embodiment, part of the physical structure used to implement the pipes 120 includes an array of queues.

In an embodiment, customers pay a fee to the service provider in exchange for a committed amount of bandwidth through the service provider edge device (or through the service provider's network). The fee paid by the customer is typically proportional to the amount of bandwidth that is committed to the customer. Referring to FIG. 1A, the edge device 102 forwards traffic from the customers 110 through respective pipes 120 to the network 130. The edge device 102 also forwards traffic from the network 130 through respective pipes 120 to the customers 110. The more bandwidth that is committed to a customer, the more traffic the edge device 102 will forward for the customer.

Figure 1B:
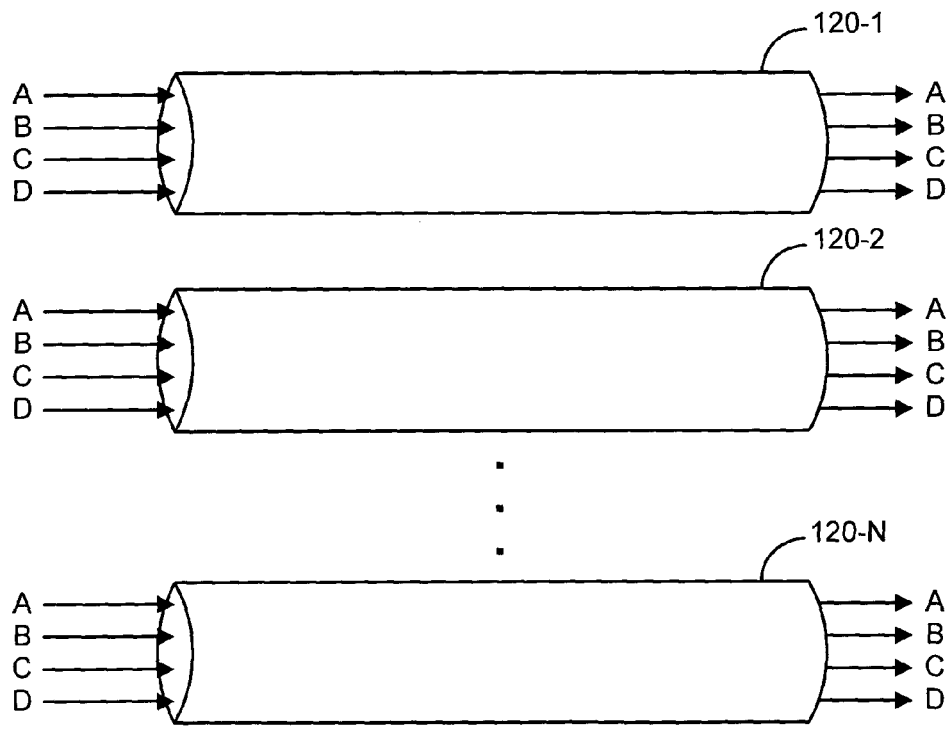

FIG. 11B is an exemplary block diagram of traffic channels that may exist within the pipes 120 that are depicted in FIG. 1A. FIG. 1B is intended to illustrate multiple traffic types that may be forwarded through the customer-specific pipes 120 on respective traffic channels. In an embodiment, each customer may be allocated up to four traffic channels with each traffic channel being associated with a different traffic type (e.g., A, B, C, and D). In an alternative, the number of traffic channels may be more or less than four. In another alternative, the customers may be allocated some other maximum or variable number of traffic channels. In still another alternative, different customers may have different numbers of channels. In any case, the edge device 102 forwards traffic for a customer through the pipe associated with the customer on a traffic channel that is associated with the traffic type. In an embodiment, the traffic channels are also logical elements. A physical structure used to implement the traffic channels includes the array of queues that is used to implement the pipes 120 (FIG. 1A).

Figure 1C:
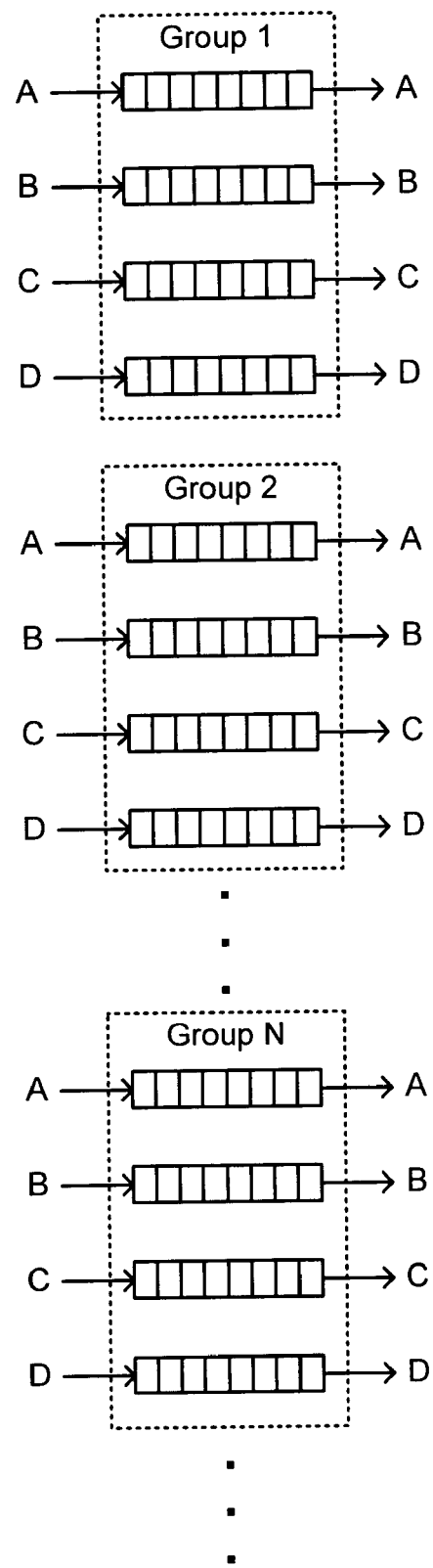

In accordance with an embodiment of the invention, a group of queues within an edge device is dedicated to a customer. Individual queues with the customer-specific group are further dedicated to different traffic types of the customer. Traffic within the individual queues is rate-shaped according to queue-specific bandwidth limitations and the traffic of the group of queues is rate shaped as a whole (i.e., on an aggregate basis) according to a group-specific bandwidth limitation. FIG. 1C depicts queues that are grouped together in customer-specific groups. Each queue in the customer-specific groups is dedicated to a different traffic type. Though FIG. 1C illustrates a single queue for each traffic type, this is simply for illustrative convenience and an arbitrarily large number of queues could be used for each traffic type without deviating from the scope of the invention. In an embodiment, the group establishment module 104 depicted in FIG. 1A, dedicates queues to particular groups. The grouped queues need not be in any particular order in hardware. In other words, in an embodiment, the queues are grouped logically.

In order to perform queue-specific rate shaping, each queue is associated with a queue-specific rate shaper. Traffic that passes through a queue is tracked (counted) to determine bandwidth usage for the queue. The queue-specific rate shaper may be configured according to customer traffic-type-specific preferences. In order to perform group-specific rate shaping, each group of queues is associated with a group-specific rate shaper. Traffic that passes through the queues of the group is tracked to determine bandwidth usage for the group as a whole. The group-specific rate shaper may be configured according to the customer-specific bandwidth limitations. Accordingly, any traffic passing through a particular queue is rate shaped on a per-traffic type and per-customer basis. Queue-specific and group-specific rate shapers are discussed in more detail below with reference to FIGS. 2A and 2B.

Figure 2A:
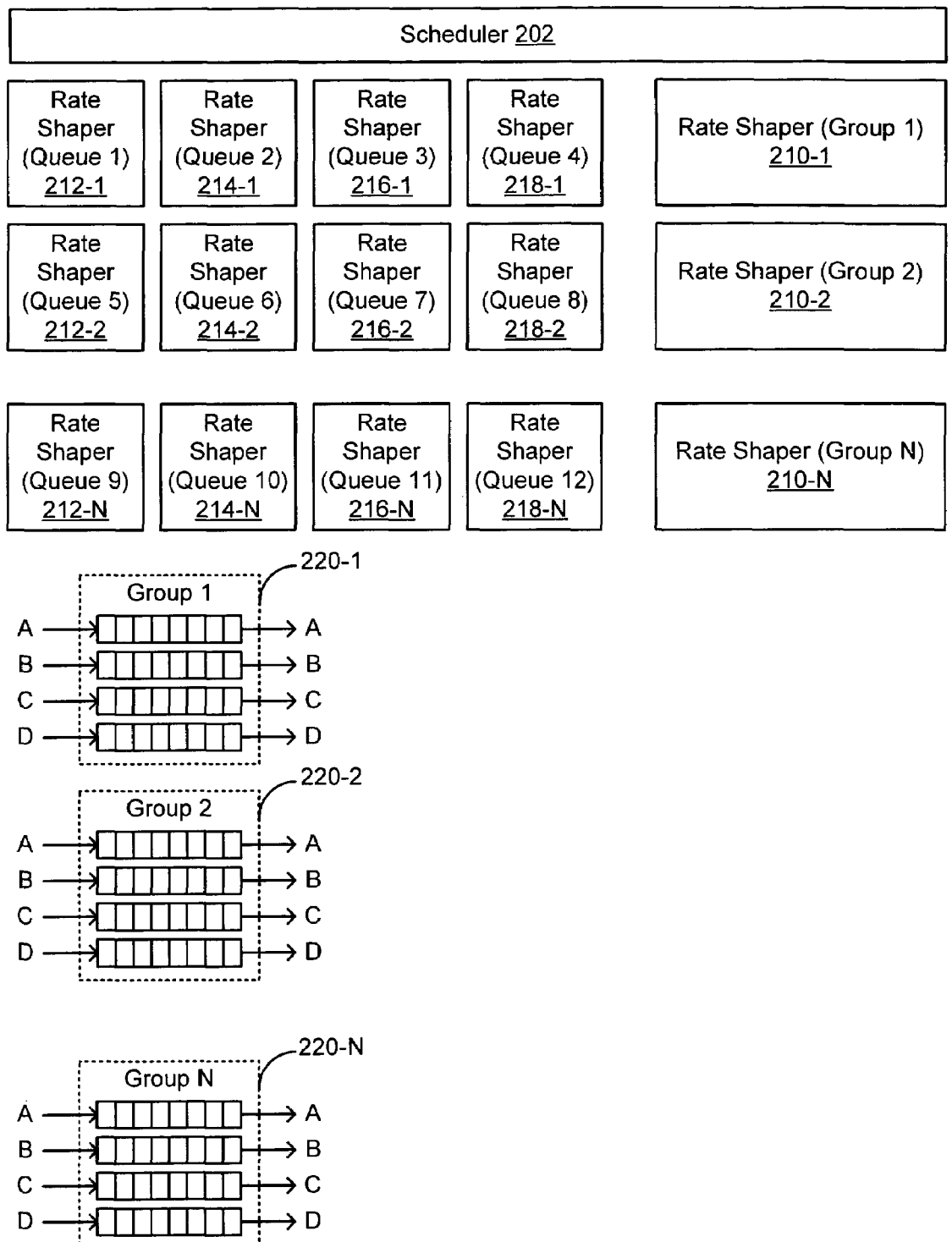

FIGS. 2A and 2B are intended to illustrate a use for the system 100 described above with reference to FIGS. 1A to 1C. FIG. 2A is a block diagram of a packet-based traffic forwarding system 200 in accordance with an embodiment of the invention. The system 200 includes a scheduler 202, queue-specific rate shapers 212-1 to 212-N, 214-1 to 214-N, 216-1 to 216-N and 218-1 to 218-N (referred to collectively as queue-specific rate shapers 212 to 218), multiple group rate shapers 210-1 to 210-N, and queue groups 220-1 to 220-N (referred to collectively as groups 220). FIG. 2A is a logical depiction and is not intended to illustrate an actual physical layout of the various components of the system 200. In an embodiment, the queue groups 220 are similar to the queue groups described above with reference to FIG. 1C. In FIG. 2A, a suffix of "-X" denotes an association with a queue group X. For example, the queue-specific rate shapers 212-1, 214-1, 216-1 and 218-1, the group rate shaper 210-1, and the queue group 220-1 are all associated with a queue group 1.

A group establishment module, such as the group establishment module 104 (FIG. 1A), associates queues with groups. For example, when a customer is allocated bandwidth, the group establishment module logically organizes multiple queues into a group that is associated with the customer. The customer typically does not pick specific queues. Rather, the group establishment module dedicates queues to a customer according to bandwidth, number of traffic types, or other system or customer requirements. Then the group establishment module groups the queues and associates the group with the customer. In an embodiment, the dedicated queues are exclusive to one customer. That is, packets associated with different customers are not enqueued in the same dedicated queue.

The group establishment module also associates groups of queues with group-specific rate shapers. The group-specific rate shapers are configured on a per customer basis according to the bandwidth allocated to the customers (the customer-specific bandwidth limitation). The group-specific rate shapers control the output of traffic from all of the queues in the respective group on an aggregate basis. In an embodiment, the group-specific rate shapers also facilitate full utilization of excess unused bandwidth up to a customer-specific bandwidth limitation.

While the group-specific rate shapers facilitate the shaping of traffic according to customer-specific bandwidth limitations, the queue-specific rate shapers facilitate the shaping of traffic according to queue-specific bandwidth limitations. In an embodiment, the customer provides rate shaping parameters for one or more traffic types and the group establishment module configures respective queue-specific rate shapers to conform to the provided rate shaping parameters. For example, a customer may have four traffic types that are to be treated differently. The customer may elect to allocate 40% of the total (group) bandwidth to a traffic type A, 30% to a traffic type B, 20% to a traffic type C, and 10% to a traffic type D. A group establishment module, such as the group establishment module 104 (FIG. 1A) translates the traffic-type-specific allocation to a queue-specific bandwidth limitation. This is accomplished in a straight-forward manner because each queue has an associated queue-specific rate shaper. For example, if each traffic type is associated with a different queue, each traffic-type-specific allocation corresponds to a queue-specific bandwidth limitation.

In an embodiment, the scheduler 202 schedules traffic in two rounds. Round 1 is for scheduling packets according to the queue-specific rate shapers 212 to 218 and Round 2 is for scheduling packets according to the group rate shapers 210. Both Round 1 and Round 2 are further divided into four subrounds. The number of subrounds corresponds to the number of traffic types. Since in this example there are four traffic types (A, B, C, and D), there are four subrounds. Alternatively, the number of subrounds may be more or less than the number of traffic types. In another alternative, the traffic types are associated with priorities. In this case, queues of a group are prioritized with respect to one another. In a round, the scheduler may schedule one or more packets enqueued in the queues according to a priority associated with the queues. The scheduler 202 may be configured to go to Round 2 only after considering each of the priorities in Round 1.

FIG. 2B is an exemplary diagram of vectors and values after each subround of each round carried out by the scheduler 202. FIG. 2B includes 6 columns: a round/subround column, a percentage of group bandwidth available (% group bw available) column, an individual queue percentage of group bandwidth vector (individual queue % group bw vector) column, an individual queue enablement vector column, a group enablement column, and a result vector column. The round/subround indicates the round/subround that was carried out to yield the values in the other columns of the row. The % group bw available column indicates the percentage of group bandwidth that has not yet been consumed by forwarding traffic from queues associated with the group at the end of a subround. The individual queue % group bw vector column shows the percentage of group bandwidth that has been consumed in the subround by each of four queues (queue 1, queue 2, queue 3, and queue 4). An allocated bandwidth vector 232 in the individual queue % group bw vector column represents the allocated queue-specific bandwidth for each queue. A load vector 234 in the individual queue % group bw vector column represents the amount of traffic enqueued (or arriving) in each queue as a percentage of group bandwidth that the enqueued (or arriving) traffic would consume if it were forwarded in its entirety. In this example, the enqueued traffic would consume 145% (0+50+90+5=145) of group bandwidth if it were all forwarded at once. Accordingly, the traffic should be restricted to 100% of group bandwidth. The individual queue enablement vector column indicates which queues are enabled. Enabled queues are permitted to consume bandwidth up to their allocated queue-specific bandwidth by forwarding enqueued packets. Queues are not enabled if they have consumed their allocated queue-specific bandwidth. The group enablement column indicates whether the group is enabled for transmission. The group is enabled as long as all of the allocated group bandwidth has not been consumed. The result vector column indicates which queues are enabled for sending on either queue-specific and group-specific bandwidth (round 1) or group-specific bandwidth (round 2).

The example to be described with reference to FIG. 2B starts with round 1, subround 1. Hereinafter, reference to a round "A/B" is a reference to round A, subround B. For example, round 1, subround 1 may be referred to as round 1/1. After the scheduler 202 (FIG. 2A) attempts to schedule, for a first group, a packet from a first queue associated with a traffic type A, the vectors and values are as indicated in the row associated with round 1/1. Since the first queue had no packets enqueued, as indicated by the load vector 234, the % group bw available remains 100. (It is assumed for the purposes of this example that 100% was available initially.) Similarly, the individual queue % group bw vector remains all zeros. (It is assumed for the purposes of this example that the vector is all zeros initially.) Since the allocated bandwidth vector 232 indicates the first queue is allocated 40% of group bandwidth, the queue remains enabled, as indicated in the individual queue enablement vector. Also, since group bandwidth remains, the group enablement column indicates the group remains enabled. The result vector indicates all four of the queues remain enabled for individual queue forwarding. It should be noted that in an embodiment, the scheduler 202 attempts to schedule, for other groups, a packet from a first queue associated with a traffic type A in round robin fashion. However, for the purposes of this example, only one group is considered.

In round 1/2, queue 2 is permitted to send traffic up to its queue-specific bandwidth limitation. As shown in the allocated bandwidth vector 232, the queue-specific bandwidth limitation for queue 2 is 30%. Since queue 2 has enough traffic to consume more than 30% (up to 50%, in fact, as shown in the load vector 234), queue 2 is permitted to consume its entire queue-specific bandwidth. Accordingly, after round 1/2, the % group bw available is 70% (100−30=70). The individual queue % group bw vector indicates that 30% of bandwidth was consumed by queue 2. The individual queue enablement vector indicates queue 2 is no longer enabled after subround 2, though the group enablement column indicates the group is still enabled. The result vector, accordingly, indicates queue 2 is not enabled because in round 1, both the individual queue enablement vector and the group enablement must be 'Y'.

In round 1/3, queue 3 is permitted to send traffic up to its queue-specific bandwidth limitation. As shown in the allocated bandwidth vector 232, the queue-specific bandwidth limitation for queue 3 is 20%. Since queue 3 has enough traffic to consume more than 20% (up to 90%, in fact, as shown in the load vector 234), queue 3 is permitted to consume its entire allocated queue-specific bandwidth. Accordingly, after round 1/3, the % group bw available is 50% (70−20=50). Since, like queue 2, queue 3 had more traffic to send (load vector 234) than allocated individual queue bandwidth (allocated bandwidth vector 232), queue 3 is not enabled after round 1/3.

In round 1/4, queue 4 is permitted to send traffic up to its queue-specific bandwidth limitation. As shown in the allocated bandwidth vector 232, the queue-specific bandwidth limitation for queue 4 is 10%. Since the traffic of queue 4 is not enough to consume 10% (only up to 5%, in fact, as shown in the load vector 234), queue 4 is permitted to send all enqueued traffic. Accordingly, after round 1/4, the % group bw available is 45% (50−5=45). Since queue 4 did not consume all of its queue-specific bandwidth, queue 4 remains enabled after round 1/4. When round 1 ends, the % group bw available is referred to as excess unused bandwidth.

In round 2, excess unused bandwidth is distributed to a subset of the queues in priority order. In this example, excess unused bandwidth is 45% of total bandwidth. It should be noted, however, that if each queue consumed all of its queue-specific bandwidth, there would be no excess unused bandwidth to distribute in round 2. It should further be noted that in round 2 the individual queue enablement vector column is practically irrelevant for the purposes of determining the result vector.

As was the case for each subround of round 1, each subround of round 2 corresponds to a queue. This is significant when the bandwidth available is less than the amount of bandwidth that the enqueued traffic would consume if it were all forwarded. In an embodiment, higher priority queues are associated with earlier subrounds than the lower priority queues. Accordingly, higher priority queues are given the opportunity to consume excess unused bandwidth before lower priority queues are given the opportunity. Though it was not an issue in the example above for round 1, it should be noted that if the sum of queue-specific bandwidth limitations are greater than the total bandwidth, priority ordering may have an effect in round 1 that is similar to the effect described below with reference to round 2. Namely, bandwidth allocation may be biased in favor of higher priority queues.

After round 2/1, the % group bw available is still 45% because queue 1 has no traffic to forward. So, even though queue 1 has the highest priority, queue 1 does not consume any of the excess unused bandwidth. Since excess unused bandwidth remains after round 2/1, the result vector indicates that all four of the queues remain enabled.

In round 2/2, queue 2 is permitted to consume as much excess unused bandwidth as is available. The load vector 234 indicates that queue 2 initially had sufficient traffic to consume 50% of total bandwidth. The individual queue % group bw vector of round 1/2 shows that queue 2 has already been permitted to consume 30% of total bandwidth. Since queue 2 has enough traffic to consume up to 20% more bandwidth (50−30=20), and there is at least 20% more excess unconsumed bandwidth (45%, in fact), queue 2 is permitted to send all enqueued traffic. Accordingly, after round 2/2, the % group bw available is 25% (45−20=25). Queue 2 remains enabled, as do all of the other queues, since excess unconsumed group bandwidth remains.

In round 2/3, queue 3 is permitted to consume the remaining excess unused bandwidth. The load vector 234 indicates that queue 3 initially had sufficient traffic to consume 90% of total bandwidth. The individual queue % group bw vector of round 1/3 shows that queue 3 has already been permitted to consume 20% of total bandwidth. Since queue 3 has enough traffic to consume up to 70% more bandwidth (90−20=70), but there is only 25% remaining, queue 3 is only permitted to send enough enqueued traffic to consume the remaining 25% excess unused bandwidth. Accordingly, after round 2/3, the % group bw available is 0% (25−25=0). In round 2, when no excess unused bandwidth remains, group enablement is set to 'N'. Accordingly, as indicated in the group enablement column, the group is no longer enabled. Also, the result vector indicates no queues are enabled since, in round 2, the result vector is determined from the group enablement. Therefore, no more packets are forwarded. After round 2/4, the result vector is unchanged.

Figure 3:
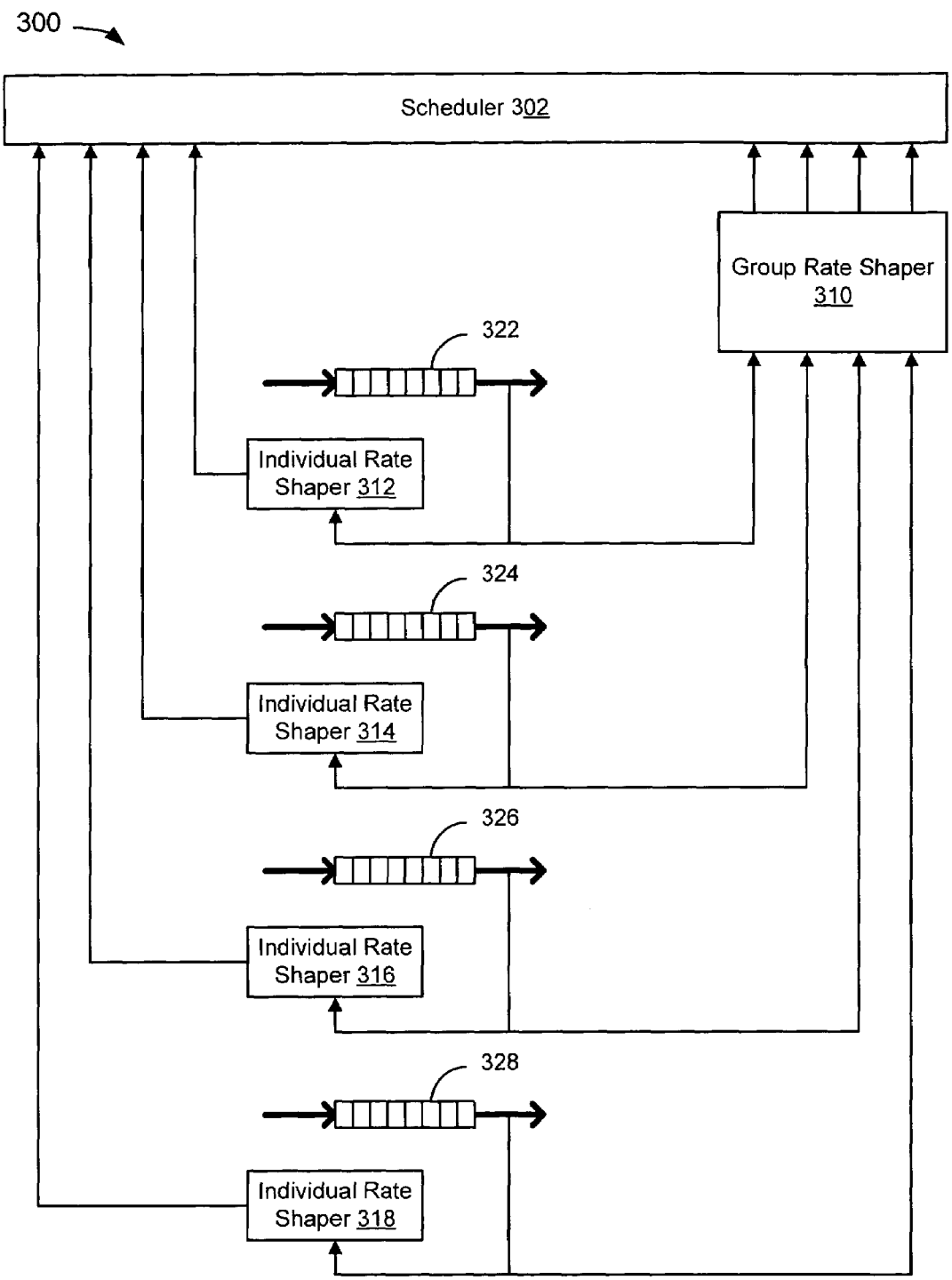
FIG. 3 is a block diagram of a customer-specific traffic shaping system in accordance with an embodiment, for use in the system of FIG. 1A.

FIG. 3 is a block diagram of a customer-specific traffic shaping system 300 in accordance with the invention, for use in the system of FIG. 1A. To avoid cluttering the drawing, the mechanism for controlling the traffic of only one group of queues is illustrated in FIG. 3. The system 300 includes a scheduler 302, a group rate shaper 310 coupled to the scheduler 302, multiple queue-specific rate shapers 312-318 coupled to the scheduler, and multiple queues 322-328. FIG. 3 is a logical depiction and is not intended to illustrate an actual physical layout of the various components of the system 300.

With reference to queue 322, packets received at the queue are represented by the thick arrow pointing toward the left side of the queue 322. The queue 322 is associated with a queue-specific rate shaper 312. The queue-specific rate shaper 312 tracks packets forwarded from the queue 322 and controls the flow of packets from the associated queue. The forwarded packets are represented in FIG. 3 by the thick arrow pointing out of the right side of the queue 322. As long as the packets forwarded from the queue 322 do not consume more bandwidth than is allocated to the queue, the queue-specific rate shaper 312 informs the scheduler 302 that the queue 322 is enabled. It should be noted that to be enabled, group bandwidth must also be available. The group rate shaper 310 samples traffic forwarded from the queue 322 and from the other queues in the group. As long as the packets forwarded from the queue 322 and from the other queues in the group do not consume more bandwidth than the group has allocated, the group rate shaper lets the scheduler 302 know that the queue 322 and the other queues are enabled for sending on unconsumed group bandwidth. The other queues 324, 326, and 328 and queue-specific rate shapers 314, 316, and 318 are coupled and behave similarly to the queue 322 and queue-specific rate shaper 312 just described.

In an embodiment, in a round, the scheduler 302 considers each of the queues 322-328 and each of the queues of the other groups (not shown). In another embodiment, each of the queues 322, 324, 326, and 328 is associated with a priority and the scheduler 302 schedules packets for forwarding according to the associated priority. An example of forwarding according to the associated priority is explained above with reference to FIG. 2B, where queues scheduled in each subround have an associated priority that is different from queues scheduled in other subrounds.

Figure 4A:
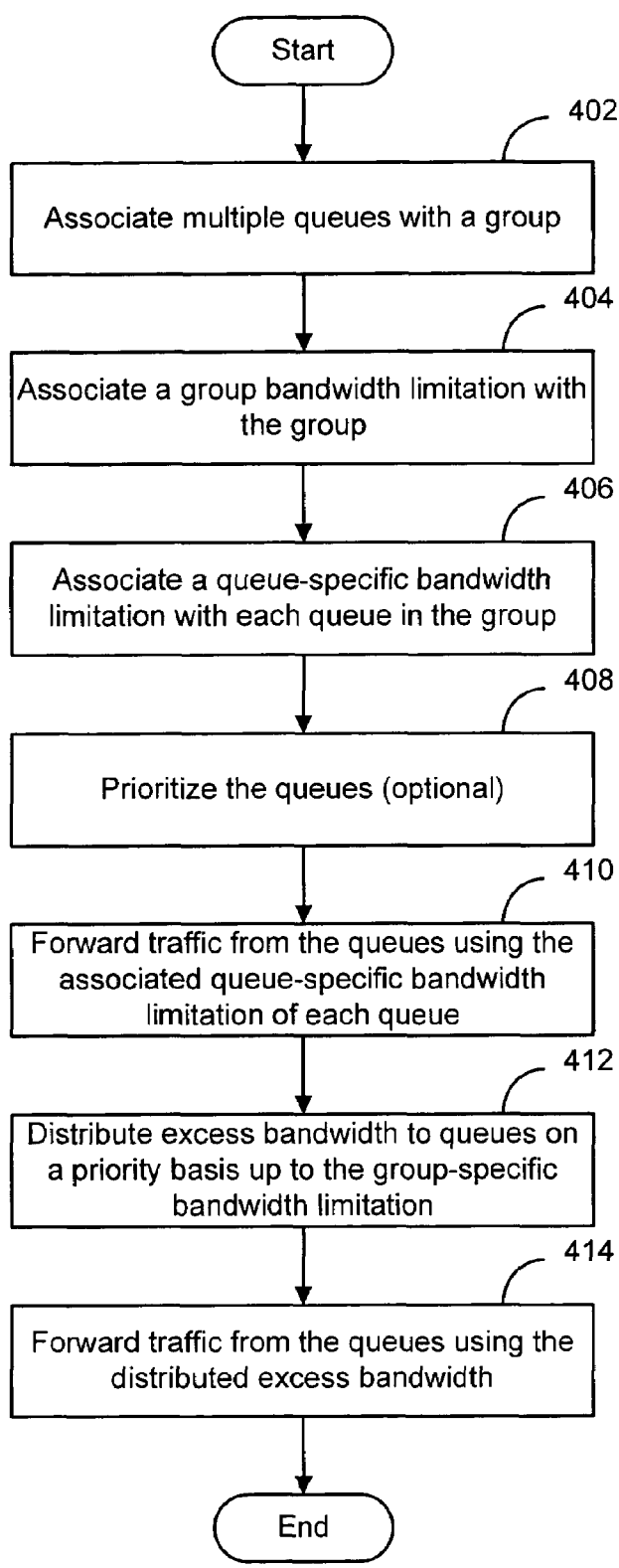
FIGS. 4A, 4B, and 4C are flowcharts of methods for customer-specific traffic shaping in accordance with an embodiment, to be implemented by the system of FIG. 1A.
Figure 4B:
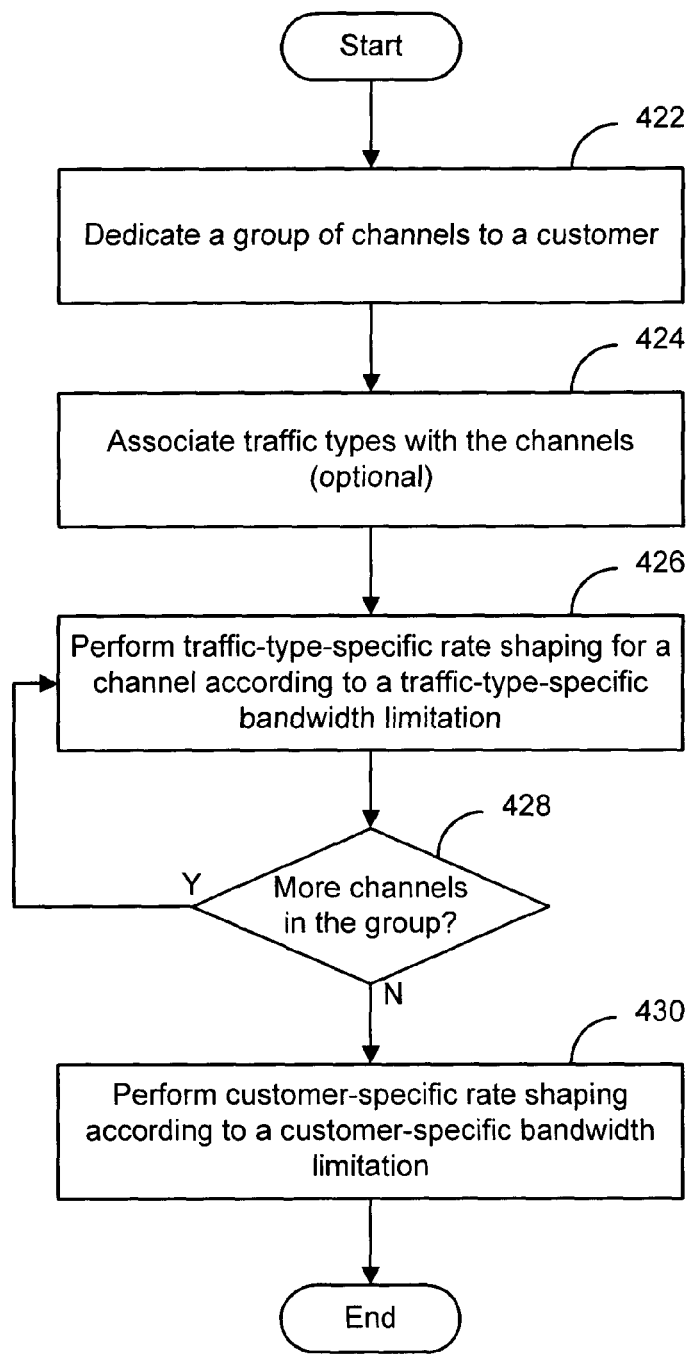
Figure 4C:
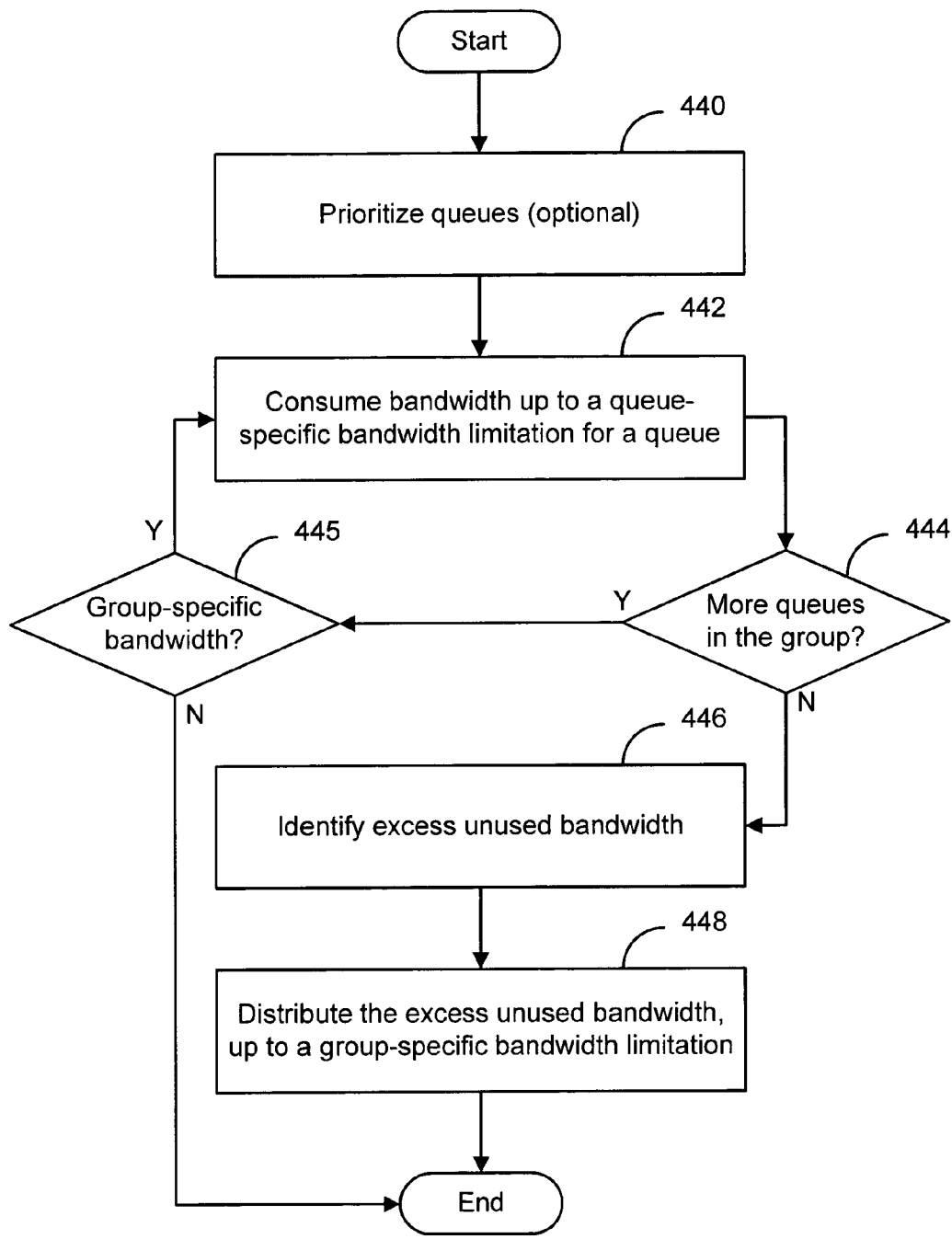

FIGS. 4A, 4B, and 4C are flowcharts of embodiments of the invention for use with the system 100 (FIG. 1A). FIG. 4A is intended to illustrate a flowchart 400A of a method for customer-specific packet-based traffic shaping that incorporates the techniques described above with reference to FIGS. 1 to 3. The flowchart 400A begins with the formation of a group, as described above with reference to FIG. 2A, and continues through a first and second round, as described above with reference to FIG. 2B, then ends. The flowchart 400A starts at step 402 with associating multiple queues with a group. At step 404 a group bandwidth limitation is associated with the group. At step 406, a queue-specific bandwidth limitation is associated with each queue. At step 408, the queues associated with the group are prioritized with respect to one another. At step 410, traffic is forwarded from the queues using the associated queue-specific bandwidth limitation (and group-specific bandwidth limitation) of each queue. At step 412, excess unused bandwidth is distributed to queues on a priority basis up to the group-specific bandwidth limitation. At step 414, traffic is forwarded from the queues using the distributed excess unused bandwidth.

FIG. 4B is intended to illustrate a flowchart 400B depicting a method for forming a group of traffic channels, followed by a first and second round, from a more customer-oriented angle. For example, a customer does not allocate particular queues to support type-specific flow control. Rather, the customer allocates traffic-type-specific bandwidths. The terminology of the flowchart 400B is selected with this in mind. It should be noted that the terminology may be broader in scope than more device-specific language. The flowchart 400B starts at step 422 with dedicating a group of traffic channels to a customer. As described with reference to FIGS. 1A to 1C, a traffic channel could be implemented, at least in part, using a queue. However, from the perspective of a customer, queues may have little meaning. The number or size of traffic channels is determined by the amount of bandwidth allocated to the customer. From the perspective of a customer, a traffic channel is a portion of a "pipe" through which traffic is forwarded with a bias in favor of traffic types that are determined by the customer. At optional step 424 traffic types are associated with the traffic channels. At step 426 traffic-type specific rate shaping for a traffic channel is performed according to a traffic-type specific bandwidth limitation. At decision point 428 it is determined whether there are more traffic channels in the group. If so, step 426 is repeated until no traffic channels are left. Steps 426 and 428 correspond to a round 1, wherein traffic-type specific bandwidth is consumed by the customer's traffic. It should be noted that in round 1, in an alternative, the traffic-type specific rate shaping is constrained by a customer-specific bandwidth limitation (not shown). At step 430, customer-specific rate shaping is performed according to the customer-specific bandwidth limitation. Step 430 corresponds to a round 2 where excess unused bandwidth allocated to the customer is consumed, assuming the customer has sufficient traffic to consume the excess unused bandwidth.

FIG. 4C is intended to illustrate a flowchart 400C depicting a method for distributing unused excess unused bandwidth after queue-specific rate shaping. The flowchart 400C starts with (optionally) prioritizing queues and ends after unused excess unused bandwidth has been distributed. The flowchart 400C starts at optional step 440 with prioritizing queues. At step 442, bandwidth is consumed up to a queue-specific bandwidth limitation for a queue. At decision point 444, it is determined whether there are more queues in the group. If so, it is determined at decision point 445 whether group-specific bandwidth is available. If so, step 442 is repeated for another queue. If the queues are prioritized, the queues may be selected in priority order. It should be noted that it is possible that the sum of queue-specific bandwidths exceeds the group-specific bandwidth. If the group-specific bandwidth is consumed, the flowchart ends. Otherwise, steps 442 to 445 are repeated for each queue of the group. At step 446, excess unused bandwidth is identified. It should be noted that it is possible that the sum of queue-specific bandwidths is less than the group-specific bandwidth. In this case, there may always be excess unused bandwidth. At step 448, the excess unused bandwidth is distributed up to the group-specific bandwidth limitation. If the queues are prioritized, the excess unused bandwidth may be offered to the queues on a priority basis. When the excess unused bandwidth has been offered to each queue, the flowchart 400C ends. The flowchart may end with excess unused bandwidth that has not been consumed by the queues. In an embodiment, that bandwidth is wasted.

In one embodiment, the method steps described above are embodied in a computer-readable media as computer instruction code. It shall be appreciated that not all methods steps described must be performed, nor must they be performed in the order stated.

Bandwidth limitations are described herein as percentages of total bandwidth for illustrative convenience. Bandwidth may be described in other ways, including but not limited to bytes per second.

The term queue is defined broadly to include a single queue, in hardware or software, multiple queues used together, or any hardware or software components combined to emulate a first-in-first-out (FIFO) or other queue-like structure. The term queue, as used herein, further includes output queues and input queues.

Although specific embodiments of the invention have been described and illustrated, the invention is not to be limited to the specific forms or arrangements of parts as described and illustrated herein. The invention is limited only by the claims.

What is claimed is:

1. A network node for forwarding packet-based traffic, comprising:
   a plurality of queues;
   a plurality of queue-specific rate shapers respectively associated with the plurality of queues;
   a plurality of group-specific rate shapers configured to be associated with groups of the plurality of queues;
   a group establishment module configured to dedicate a group of said queues to a customer and to associate one of said group-specific rate shapers with said group of queues that is dedicated to said customer; and
   a scheduler configured to:
      schedule, in a first round, packets enqueued in the plurality of queues according to the respective plurality of queue-specific rate shapers and the respective group-specific rate shapers; and
      schedule, in a second round, packets enqueued in the plurality of queues according to the respective group-specific rate shapers;
   wherein said scheduler is further configured to:
   schedule, in subrounds of the first round, packets enqueued in the plurality of queues according to a priority respectively associated with each of the queues and schedule, in subrounds of the second round, packets enqueued in the plurality of queues according to the priority respectively associated with each of the queues;
   wherein the scheduler comprises an individual queue enablement vector for each queue, a group enablement vector for the group of queues, and a result vector for each queue;
      wherein the individual queue enablement vector indicates which queues are enabled, with a queue being enabled if the queue has not consumed its allocated queue-specific bandwidth;
      wherein the group enablement vector indicates whether the group is enabled with the group being enabled as long as all of the allocated group-specific bandwidth has not been consumed; and
      wherein the result vector indicates which queues are enabled for sending packets, wherein in the first round a result vector for a queue indicates a queue is enabled only when both the individual queue enablement vector and the group vector indicate that the queue is enabled and in the second round a result vector for a queue indicates a queue is enabled as long as the group vector indicates that the group is enabled.

2. The device of claim 1, further comprising:
   a scheduler, coupled to the plurality of queue-specific rate shapers and the plurality of group-specific rate shapers, configured to schedule packets enqueued in the plurality of queues according to the respective plurality of queue-specific rate shapers, wherein the queue-specific rate shaper respectively associated with each queue is associated with a priority, and wherein the scheduler schedules according to the associated priority.

3. The device of claim 2, wherein said scheduler is further configured to:
   scheduling packets for forwarding from a first one or more queues of said plurality of queues, wherein bandwidth consumed by the packets from each of the first one or more queues is less than or equal to respective queue-specific bandwidth limitations for the first one or more queues;
   identifying excess unused bandwidth when the consumed bandwidth is less than a group-specific bandwidth limitation, wherein a sum of the consumed bandwidth and the excess unused bandwidth approximately equals the group-specific bandwidth limitation; and
   scheduling packets for forwarding from a second one or more queues of said plurality of queues using the excess unused bandwidth.

4. The device of claim 1, further comprising:
   a plurality of pipes, wherein each pipe is associated with a group-specific rate shaper, and wherein each pipe of said plurality of pipes includes:
   multiple traffic channels comprising one or more queues of the plurality of queues, wherein each traffic channel is associated with a queue-specific rate shaper.

* * * * *